United States Patent
Iwatani et al.

(10) Patent No.: US 7,129,594 B2
(45) Date of Patent: Oct. 31, 2006

(54) SYSTEM FOR CONTROLLING GENERATOR FOR VEHICLE

(75) Inventors: Shiro Iwatani, Tokyo (JP); Yoshihito Itou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/543,404

(22) PCT Filed: Dec. 18, 2003

(86) PCT No.: PCT/JP03/16253

§ 371 (c)(1),
(2), (4) Date: Jul. 26, 2005

(87) PCT Pub. No.: WO2005/062459

PCT Pub. Date: Jul. 7, 2005

(65) Prior Publication Data

US 2006/0139012 A1   Jun. 29, 2006

(51) Int. Cl.
*H02J 11/00* (2006.01)
(52) U.S. Cl. ............... 290/40 C; 290/40 R; 290/40 A; 180/65.2; 180/56.4; 180/65.1; 332/14
(58) Field of Classification Search ............ 290/40 C, 290/40 A, 40 R; 180/65.1, 65.2, 65.4; 322/14
See application file for complete search history.

(56) References Cited

U.S. PATENT DOCUMENTS

| | | | |
|---|---|---|---|
| 6,904,342 B1 * | 6/2005 | Hanada et al. | 701/22 |
| 6,923,279 B1 * | 8/2005 | Shimane et al. | 180/65.1 |
| 6,930,405 B1 * | 8/2005 | Gunji | 290/40 C |
| 6,949,897 B1 * | 9/2005 | Wakashiro et al. | 318/139 |
| 6,952,057 B1 * | 10/2005 | Tajima et al. | 290/40 C |
| 6,958,549 B1 * | 10/2005 | Wakitani et al. | 290/40 C |
| 2002/0057074 A1 | 5/2002 | Aoyama et al. | |

FOREIGN PATENT DOCUMENTS

| | | |
|---|---|---|
| JP | 60-66698 A | 4/1985 |
| JP | 62-107643 A | 5/1987 |
| JP | 6-351173 A | 12/1994 |
| JP | 3102981 B2 | 10/2000 |

* cited by examiner

*Primary Examiner*—Darren Schuberg
*Assistant Examiner*—Iraj A. Mohamdesi
(74) *Attorney, Agent, or Firm*—Sughrue Mion, PLLC (57) ABSTRACT

A control system for a vehicular generator is provided which can be simplified in construction as the entire system to achieve cost reduction by using only a single control terminal that takes in a control signal from outside and by employing the control signal composed of only three kinds of signals. The system includes a generator 2 having an armature coil 202 and a field coil 201, a battery 4 to be charged by a power generation voltage, and a control circuit 1A that adjusts the power generation voltage by controlling to turn a field current supplied to the field coil 201 on and off in accordance with a battery voltage. A single control terminal C is provided on the control circuit 1A, and an external control unit 5 is connected to the control terminal C. The external control unit 5 supplies either one of a ground signal, an open signal and a pull-up signal to the control terminal C as a control signal in accordance with the battery voltage and an operating condition of the vehicle. The control circuit 1A interrupts the field current to stop power generation in response to the ground signal, adjust the power generation voltage to a first control voltage for normal time in response to the open signal, and adjusts the power generation voltage to a second control voltage higher than the first control voltage in response to the pull-up signal.

4 Claims, 5 Drawing Sheets

SYSTEM FOR CONTROLLING GENERATOR FOR VEHICLE

TECHNICAL FIELD

The present invention relates to a control system for a vehicular generator which is capable of achieving the simplification of a circuit configuration and cost reduction in a control apparatus for adjusting the generation voltage of the generator by using only three kinds of control signals supplied from external terminals.

BACKGROUND ART

Figure 5:
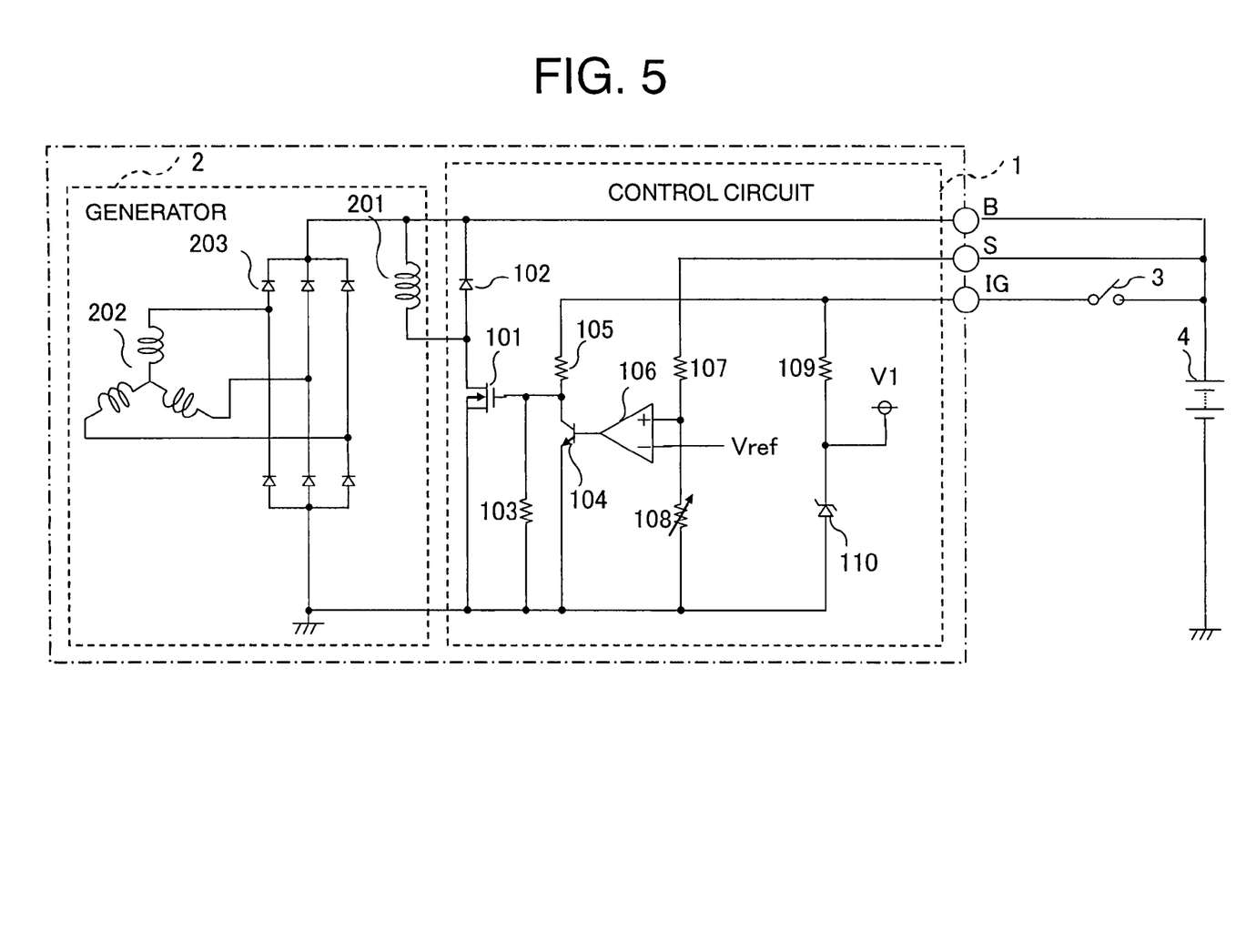
FIG. 5 is a circuit diagram showing a known control system for a vehicular generator.

FIG. 5 is a circuit diagram that illustrates a known control system for a vehicular generator.

In FIG. 5, the known control system for a vehicular generator includes a control circuit 1 installed on a vehicle for adjusting the voltage of power generated, a vehicle-mounted generator 2 having a field coil 201, an armature coil 202 and a rectifier 203, a key switch 3 that is turned on when the vehicle is driven to operate, and a vehicle-mounted battery 4 adapted to be charged by the power generation voltage output from the armature coil 202 through the rectifier 203.

The control circuit 1 has a voltage detection circuit for detecting the terminal voltage of the battery 4 (hereinafter referred to as "the battery voltage"), and adjusts the generated voltage to a predetermined value by controlling to turn a field current supplied to the field coil 201 on and off in accordance with the battery voltage.

For this purpose, the control circuit 1 includes an output terminal B hereinafter referred to as "B terminal") connected to the battery 4, an input terminal S (hereinafter referred to as "S terminal") for detecting the battery voltage, and a power supply input terminal IG (hereinafter referred to as "IG terminal") connected to the battery 4 through the key switch 3.

In addition, the control circuit 1 includes a power MOSFET 101 connected to the field coil 201, a blocking (reverse current prevention) diode 102 connected to an output terminal of the power MOSFET 101, a transistor 104 for turning the power MOSFET 101 on and off, resistors 103, 105 connected to the IG terminal, a comparator 106 for turning the transistor 104 on and off, a resistor 107 and a variable resistor 108 both connected to the S terminal (external voltage detection terminal), and a resistor 109 and a Zener diode 110 connected to the IG terminal.

A junction between the resistors 103, 105 are connected to an output terminal of the transistor 104 and a gate terminal of the power MOSFET 101.

The comparator 106, the resistor 107 and the variable resistor 108 together constitute a voltage detection circuit for detecting the battery voltage.

That is, the resistor 107 and the variable resistor 108 serve to divide the battery voltage to generate a detection voltage, which is input to the comparator 106.

A junction between the resistor 107 and the variable resistor 108 is connected to a comparison input terminal (+) of the comparator 106 which has a reference input terminal (−) impressed with a reference voltage Vref.

In FIG. 5, when the key switch 3 is turned on (closed) upon starting of the vehicle, a gate voltage of the power MOSFET 101 becomes a voltage value equal to the battery voltage divided by a voltage division ratio of the resistors 103, 105, whereby the power MOSFET 101 is made into a conductive state. As a result, a field current is supplied to the field coil 201 so that the generator 2 becomes able to generate electric power.

On the other hand, the Zener diode 110, to which the battery voltage is supplied through the resistor 109, constitutes a constant-voltage power supply V1 that generates a constant voltage based on the battery voltage. Also, a reference voltage Vref (a reference of comparison to the battery voltage) in the comparator 106 is generated based on the constant-voltage power supply V1.

When the generator 2 starts generating electricity in accordance with the engine starting of the vehicle, the voltage detection circuit 107, 108 in the control circuit 1 detects the battery voltage from the S terminal, and inputs it to the comparison input terminal (+) of the comparator 106.

When this detected voltage becomes higher than the predetermined voltage Vref set at the reference input terminal (−), the transistor 104 becomes conductive due to an ON output of the comparator 106, thereby interrupting or turning off the power MOSFET 101. As a result, the field current is decreased to reduce the power generation voltage of the generator 2.

On the other hand, when the detected value of the battery voltage falls below the reference voltage Vref, the transistor 104 is interrupted or turned off due to an OFF output of the comparator 106, so that the power MOSFET 101 becomes conductive. As a result, the field current is increased to raise the power generation voltage of the generator 2.

Thus, the power generation voltage of the generator 2 is controlled to the predetermined constant voltage due to the repeated on-off control of the field current.

However, when an automotive generator is driven to operate, it becomes necessary to suppress the power generation voltage in accordance with the operating condition of the vehicle to reduce the engine load, or on the contrary to facilitate the power generation voltage so as to rapidly charge the battery. Therefore, it is necessary to make it possible to set the power generation voltage to three or more kinds of levels.

Accordingly, there has been proposed a system that can change the voltage adjusted by the control unit in accordance with a control signal from an external control unit.

Such a kind of control system for a vehicular generator is described, for example, in Japanese patent application laid-open No. S62-107643. In this case, however, there arises a problem that in order to set the power generation voltage at three levels, two external input terminals are required, resulting in an increased number of wirings for the control unit.

In addition, Japanese patent No. 3102981, for example, is given as a control system in which only a single input terminal from an external control unit is provided for arbitrarily adjusting a control voltage. In this case, however, it is necessary to arrange a circuit for determining an external input signal inside the control unit, so the construction of the control unit becomes very complicated. As a result, there is a problem that an increase in costs can not be avoided.

DISCLOSURE OF THE INVENTION

The present invention is intended to obviate the problems as referred to above, and has for its object to obtain a control system for a vehicular generator which requires a single control terminal that is dedicated to take in a control signal from the outside, thereby to simplify the entire system and achieve cost reduction, and in which the control signal comprises three kinds of signals (a ground signal, an open signal and a pull-up signal).

A control system for a vehicular generator according to the present invention includes: a generator that is installed on a vehicle and has an armature coil and a field coil; a battery that is installed on the vehicle so as to be charged by a power generation voltage output from the armature coil; and a control unit that has a voltage detection circuit for detecting a terminal voltage of the battery, and adjusts the power generation voltage to a predetermined voltage by controlling to turn a field current supplied to the field coil on and off in accordance with the terminal voltage of the battery. A single control terminal is provided on the control unit. An external control unit is connected to the control terminal. The external control unit supplies either one of a ground signal, an open signal and a pull-up signal to the control terminal as a control signal in accordance with the terminal voltage of the battery and an operating condition of the vehicle. The control unit serves to make the generator into a power generation stop state by interrupting the field current in response to the ground signal supplied to the control terminal, adjust the power generation voltage to a first control voltage for normal time by controlling to turn the field current on and off in response to the open signal supplied to the control terminal, and adjust the power generation voltage to a second control voltage higher than the first control voltage by controlling to turn the field current on and off in response to the pull-up signal supplied to the control terminal.

BEST MODE FOR CARRYING OUT THE INVENTION

Embodiment 1

Figure 1:
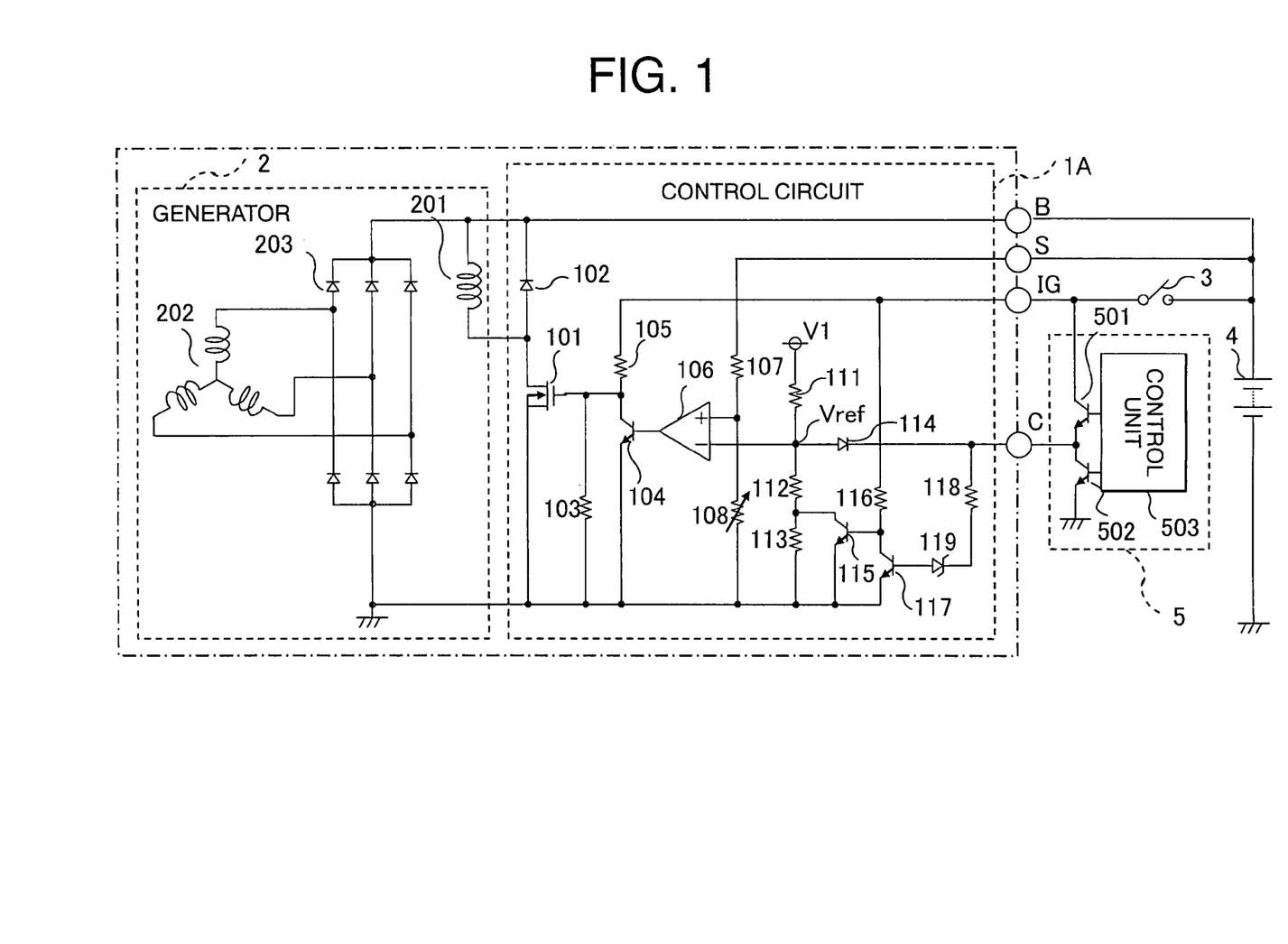
FIG. 1 is a block diagram showing a control system for a vehicular generator according to a first embodiment of the present invention.

FIG. 1 is a block diagram that shows a control system for a vehicular generator according to a first embodiment of the present invention. In FIG. 1, the parts or components same as those described above (see FIG. 5) are identified by the same symbols or by the same symbols with "A" affixed to their ends, while omitting a detailed explanation thereof.

Here, note that to avoid the complexity of the drawings, a resistor 109 and a Zener diode 110 that together constitute a power supply circuit in a control circuit 1A are omitted.

In this case, an external control unit 5 is provided in addition to the construction as stated above.

In addition, the control circuit 1A is provided with a single control terminal C (hereinafter referred to as "C terminal"), to which an external control unit 5 is connected so that a control signal from the external control unit 5 is input to the control terminal C.

The external control unit 5 supplies either one of a ground signal ground voltage), an open signal and a pull-up signal (high voltage) to the C terminal as a control signal in accordance with the battery voltage and the operating condition of the vehicle.

Moreover, the control circuit 1A serves to make the generator 2 into a power generation stop state by interrupting or cutting off the field current in response to the ground signal supplied to the C terminal. Also, the control circuit 1A adjusts the power generation voltage to a first control voltage for normal time by controlling to turn the field current on and off in response to the open signal supplied to the C terminal, and adjusts the power generation voltage to a second control voltage higher than the first control voltage by controlling to turn the field current on and off in response to the pull-up signal supplied to the C terminal.

In FIG. 1, the external control unit 5 includes transistors 501, 502 connected to the C terminal, and a control unit 503 for controlling to turn the transistors 501, 502 on and off so as to determine the control signal (the input status of the C terminal) supplied to the C terminal.

Further, the control circuit 1A includes, in addition to circuit elements 101 through 108 similar to those as described above, resistors 111, 112 and 113 that determine a voltage division ratio of a reference input terminal (−) of the comparator 106.

The resistors 111 through 113, which together constitute a voltage detection circuit in the control circuit 1A, generates a reference voltage Vref from the constant-voltage power supply V1, as previously stated.

A diode 114 is inserted between the reference input terminal (−) and the C terminal of the comparator 106.

A transistor 115 has an output terminal connected to a junction between the resistors 112, 113, and a base terminal connected to the IG terminal through a resistor 116. Also, the transistor 115 has a base terminal connected to an output terminal of another transistor 117, which has a base terminal connected to the C terminal through a Zener diode 119 and a resistor 118.

The control circuit 1A adjusts the power generation voltage in response to a control signal supplied from the external control unit 5 to the C terminal by changing the voltage division ratio of the resistors 111 through 113 to change the reference voltage Vref in accordance with the control signal.

The transistors 115, 117 function as a switching element to change the voltage division ratio of the resistors 111 through 113, and the resistors 116,118 and the Zener diode 119 function as a circuit element to turn the transistors 115, through 117 on and off.

Next, reference will be made to a concrete control operation according to the first embodiment of this present invention as shown in FIG. 1.

In normal operation, the transistor 104 is turned on and off by an ON/OFF output of the comparator 106, as stated above, whereby the power MOSFET 101 is turned on and off to decrease or increase the field current, as a consequence of which the power generation voltage of the generator 2 is controlled to be constant by repeatedly turning this field current on and off.

However, the voltage division ratio of the reference voltage Vref (divided voltage) set at the reference input terminal (−) side in the comparator 106 in the control circuit 1A is not a fixed or constant value that is determined only by the fixed power supply voltage V1, but changes into three steps in accordance with an input signal from the C terminal.

First of all, when the control signal input from the C terminal is a "ground signal (ground voltage)", in other words, when the transistor 501 is turned off (interrupted) and the transistor 502 is turned on (made conductive) by the control unit 503 in the external control unit 5, the reference input terminal (−) side of the comparator 106 is grounded through the diode 114.

As a result, the reference voltage Vref becomes 0 V, so the transistor 104 always comes into an ON (conductive) state and the power MOSFET 101 always comes into an OFF (interrupted or nonconductive) state. Accordingly, the generator 2 comes into a power generation stop state, and the power generation voltage thereof becomes 0 V.

In addition, when the control signal input from the C terminal is a "open signal", in other words, when both the transistors 501, 502 are turned off (interrupted) by the control unit 503 in the external control unit 5, the reference voltage Vref does not remain the ground signal. In this case, however, by setting the power supply voltage V1 to a value lower than the breakdown voltage of the Zener diode 119, the reference voltage Vref becomes lower than the breakdown voltage of the Zener diode 119, too.

Accordingly, the Zener diode 119 is turned off (interrupted), and the transistor 117 is also turned off (interrupted), and the transistor 115 becomes conductive. As a result, a reference voltage Vref1 determined by a voltage division ratio between the resistors 111, 112 is impressed on the reference input terminal (−) side of the comparator 106.

On the other hand, the divided voltage of the S terminal voltage (battery voltage) is impressed on the comparison input terminal (+) side of the comparator 106, whereby the battery voltage can be detected.

Accordingly, the comparator 106 controls the power generation voltage of the generator 2 to be a fixed or constant voltage by repeatedly turning the power MOSFET 101 on and off through comparison between the divided voltage of the battery voltage and the reference voltage Vref1 (the value of the power supply voltage V1 divided by the resistors 111, 112). At this time, the power generation voltage controlled based on the reference voltage Vref1 is called a first control voltage.

Next, when the control signal input from the C terminal is a pull-up signal (high voltage), in other words, when the transistor 501 is turned on made conductive) and the transistor 502 is turned off (interrupted) by the control unit 503 in the external control unit 5, the C terminal voltage is substantially raised to the battery voltage.

Accordingly, the Zener diode 119 is turned on (made conductive), and the transistor 117 is also turned on (made conductive), and the transistor 115 is turned off (interrupted).

As a result, a reference voltage Vref2 determined by a voltage division ratio between the resistor 111 and the series-connected resistors 111, 112 is impressed on the reference input terminal (−) side of the comparator 106.

The reference voltage Vref2 at this time is a divided voltage value higher than the above-mentioned reference voltage Vref1, and hence the power generation voltage (second control voltage) controlled based on the reference voltage Vref2 becomes a voltage value higher than the above-mentioned first control voltage. Hereinafter, the power generation voltage of the generator 2 is controlled to be constant by the second control voltage, as stated above.

Figure 2:
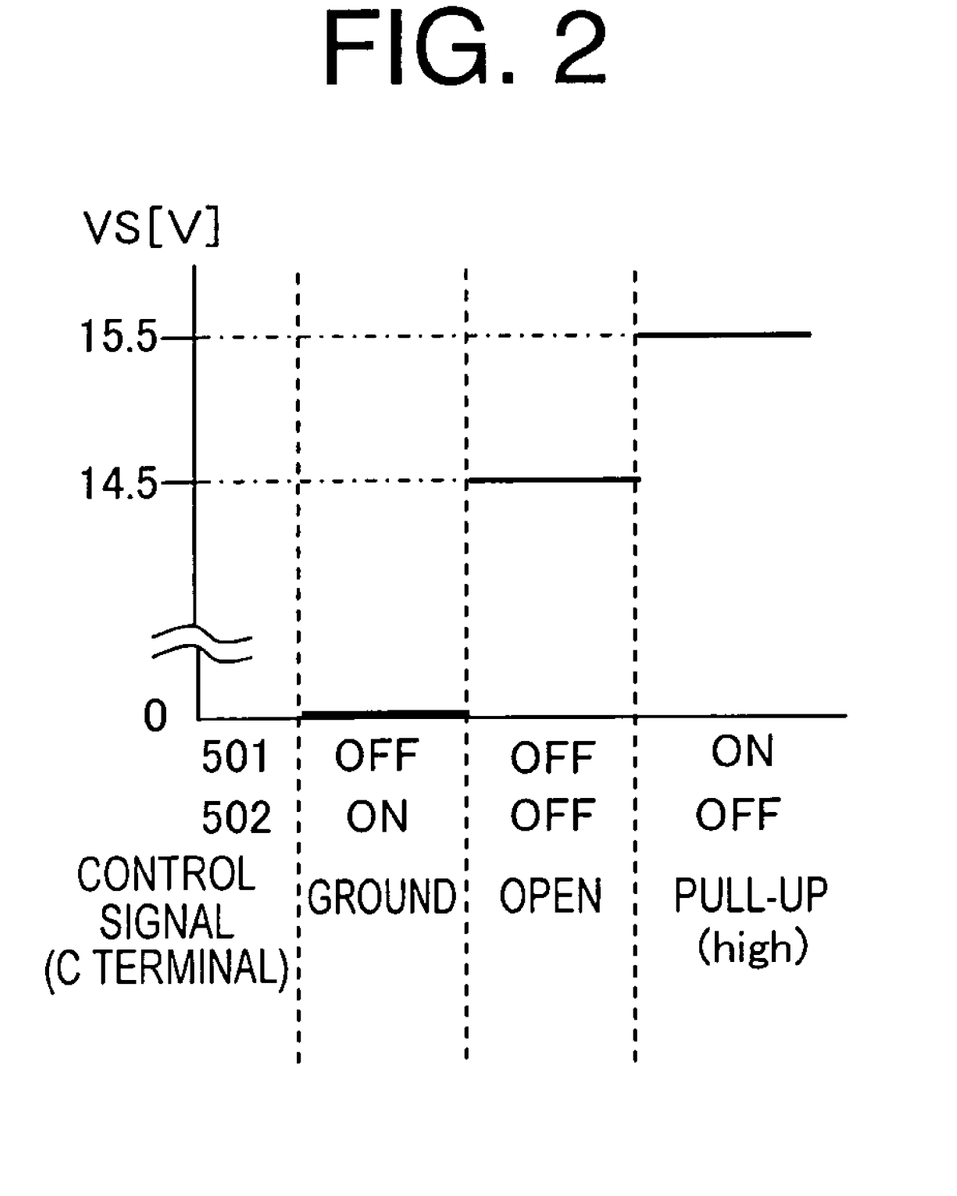
FIG. 2 is an explanatory view illustrating one example of a switching operation between a first and a second control voltage in accordance with a control signal according to the first embodiment of the present invention.

FIG. 2 is an explanatory view that illustrates one example of a switching operation for the power generation voltage (between the first and second control voltages) based on the reference voltages Vref1 and Vref2, in conjunction with the ON/OFF operation of the transistors 501, 502 in the external control unit 5.

In FIG. 2, the axis of abscissa represents the ON/OFF states of the transistors 501, 502 (control signals), and the axis of ordinate represents the S terminal voltage VS. The input signals at the C terminal correspond to the control signals, and the S terminal voltage VS corresponds to the battery voltage.

Here, note that in the case of the ground signal (ground voltage), the power generation voltage is set to 0 V, the first control voltage is set to 14 V, and the second control voltage is set to 15 V.

In this manner, the power generation voltage can be controlled at three levels of 0 V, 14.5 V (first control voltage) and 15.5 V (second control voltage) in accordance with the control signal input from the external control unit 5 through the single C terminal provided on the control circuit 1A. Accordingly, the construction of the control circuit 1A does not become complicated.

Moreover, the control signal generated in the external control unit 5 comprises only three kinds of signals, that is, the ground signal, the open signal and the pull-up (high) signal, so the construction of the control circuit 1A can be simplified and hence can be easily achieved without inviting an increase in costs.

Further, the control circuit 1A, being composed of a circuit with bipolar transistors, is less prone to influences due to noise, etc., and can perform control operation in a reliable manner.

Here, note that in FIG. 1, the voltage detection circuit in the control circuit 1A serves to set, by switching, the reference voltage Vref supplied to the reference input terminal (−) of the comparator 106 so as to correspond to the three kinds of control voltages (0 V, 14.5 V, 15.5 V) in response to the three kinds of control signals (C terminal voltages), but it may switchingly set the detected voltage value of the battery voltage supplied to the comparison input terminal (+) side of the comparator 106.

In this case, the voltage detection circuit in the control unit includes voltage detection resistors that appropriately divide the battery voltage so as to convert it into a detection voltage, and the control unit adjusts the power generation voltage in response to the control signal supplied from the external control unit 5 by changing a resistance ratio between the voltage detection resistors in accordance with the control signal.

It is needless to say that operational effects equivalent to those as stated above can be obtained in this case, too.

Furthermore, although the S terminal voltage VS is detected at the comparison input terminal (+) side of the comparator 106, the B terminal voltage can instead be made as the detected voltage while achieving similar operational effects.

Embodiment 2

Though no particular reference has been made in the above-mentioned first embodiment, engine rotation is liable to become unstable due to a rapid change in the field current (exciting current) supplied to the field coil 201 in the generator 2 at the time when switching is made between the respective control voltages (power generation voltages) (see FIG. 2). Accordingly, to avoid this, it is preferable to switch between the respective control voltages (power generation voltages: S terminal voltage) through gradual increase (or gradual decrease) control by application of duty control.

In addition, in the above-mentioned first embodiment, the comparator 106 is installed inside the control circuit 1A, and the divided voltage value (reference voltage) at the reference input terminal (−) side thereof is changed in accordance with the control signal (C terminal voltage), but a circuit comprising resistors, a Zener diode and transistors may be used instead of the comparator 106.

Figure 3:
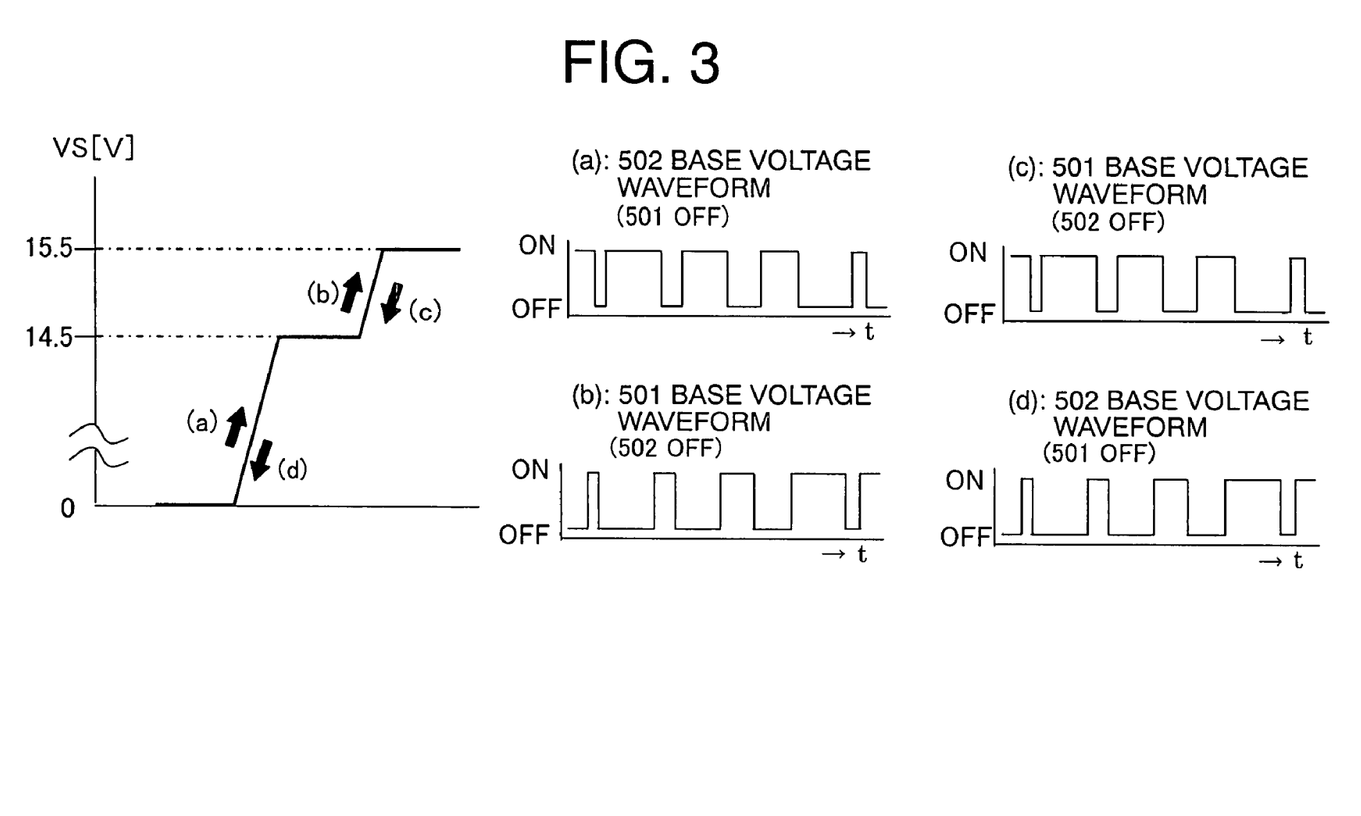
FIG. 3 is an explanatory view illustrating one example of a gradual increase (gradual decrease) switching control operation between a first and a second control voltage based on the duty control of an external control unit according to a second embodiment of the present invention.

FIG. 3 is an explanatory view that illustrates a gradual increase (or gradual decrease) switching operation for each control voltage based on the duty control according to a second embodiment of the present invention.

Figure 4:
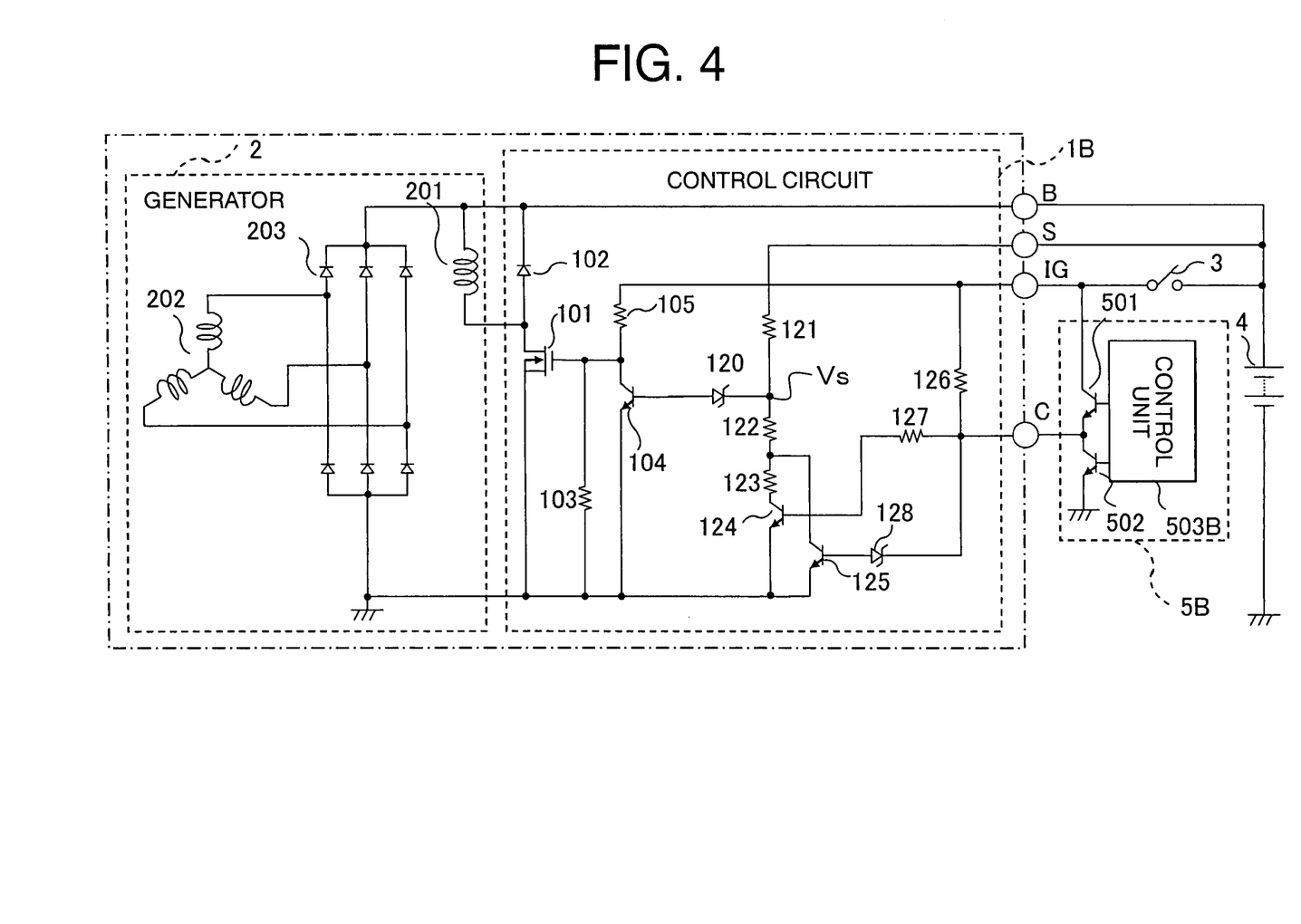
FIG. 4 is a circuit diagram showing a control system for a vehicular generator according to the second embodiment of the present invention.

FIG. 4 is a circuit diagram that illustrates a control system for a vehicular generator according to the second embodiment of the present invention, wherein there is shown the case where the operation of switching the duty ratio of the base voltage of the transistor 501 or transistor 502 (see FIG. 3) is achieved by using a circuit comprising resistors, a Zener diode and transistors.

In FIG. 4, the same parts or components as those described above (see FIG. 1) are identified by the same symbols or by the same symbols with "B" affixed to their ends, while omitting a detailed explanation thereof.

A control circuit 1B is provided with a Zener diode 120 in place of the above-mentioned comparator 106.

The Zener diode 120 has a cathode side connected to the S terminal through a resistor 121, and grounded through resistors 122, 123 and a transistor 124.

The transistor 124 has a base terminal connected to the C terminal through a resistor 127, and at the same time connected to the IG terminal through resistors 127, 126.

A junction between the resistors 122, 123 is grounded through a transistor 125, which has a base terminal connected to the C terminal through a Zener diode 128, and at the same time connected to the IG terminal through the Zener diode 128 and the resistor 126.

On the other hand, at the time when the control signal is switched in accordance with an increase or a decrease in the battery voltage and the operating condition of the vehicle, a control unit 503B in the external control unit 5B gradually increases or decreases the base voltage of the transistor 501 or 502 by controlling it as a duty signal, as shown in FIG. 3.

That is, the control unit 503B makes it possible to gradually increase or decrease the base voltage according to four kinds of duty controls, as indicated by base voltage waveforms (a) through (d) in FIG. 3, in response to four kinds of increase or decrease switchings, as indicated by arrows (a) through (d) in FIG. 3, with respect to three levels (0 V, 14.5 V, 15.5 V) of the S terminal voltage VS (control voltage).

As a result, the control circuit 1B switches the change of the control voltage in a linear (straight line) manner so as to adjust the power generation voltage in response to the C terminal voltage (duty signal) upon switching of the control signal, whereby the operating condition of the vehicle can be made stable while avoiding a rapid change in the field current.

In FIG. 3, arrow (a) indicates gradual increase control from a power generation stop state (VS=0 V) to a first control voltage (VS=14.5 V); arrow (b) indicates gradual increase control from the first control voltage (VS=14.5 V) to a second control voltage (VS=15.5 V); (c) indicates gradual decrease control from the second control voltage (VS=15.5 V) to the first control voltage (VS=14.5 V); and (d) indicates gradual decrease control from the first control voltage (VS=14.5 V) to the power generation stop state (VS=0 V).

With respect to the respective switching operations as indicated by arrows (a) through (d), the base voltages of the transistors 501, 502 in the external control unit 5B are duty controlled in the following manner.

That is, in the base voltage waveform (a) corresponding to arrow (a), the ON duty ratio of the base voltage of the transistor 502 is gradually decreased to shift the transistor 502 into its OFF state while keeping the transistor 501 in its OFF state.

Also, in the base voltage waveform (b) corresponding to arrow (b), the ON duty ratio of the base voltage of the transistor 501 is gradually increased to shift the transistor 501 into its ON state while keeping the transistor 502 in its OFF state.

In addition, in the base voltage waveform (c) corresponding to arrow (c), the ON duty ratio of the base voltage of the transistor 501 is gradually decreased to shift the transistor 501 into its OFF state while keeping the transistor 502 in its OFF state.

Further, in the base voltage waveform (d) corresponding to arrow (d), the ON duty ratio of the base voltage of the transistor 502 is gradually increased to shift the transistor 502 into its ON state while keeping the transistor 501 in its OFF state.

Thus, when the transistor 501 or the transistor 502 is switched from its conductive state into its interrupted or nonconductive state or vice versa, by duty controlling their base voltage, the voltage division ratio at the input side of the comparator 106, which is determined by the input signal from the C terminal, is controlled to gradually decrease or increase. Accordingly, the gradual increase and decrease control can be done without changing the construction of the control circuit 1B.

Moreover, by using a circuit comprising the resistors 121 through 123, 126, 127, the Zener diodes 120, 128 and the transistors 124, 125 arranged in the control circuit 1B, as shown in FIG. 4, a control voltage switching operation similar to what is done by the comparator 106 (see FIG. 1) can be achieved without using the comparator 106.

The other operations of the control circuit 1B are similar to those as described above, and the power MOSFET 101 is turned on and off by the ON/OFF operation of the transistor 104 thereby to decrease (or increase) the field current, so that the power generation voltage of the generator 2 is controlled to be constant by the repeated on-off control on the field current.

However, in FIG. 4, the control voltage is changed by a change in the divided voltage value Vs of the S terminal voltage VS that is determined in accordance with the control signal input from the C terminal without through the comparator 106 (see FIG. 1).

Next, reference will be made to the specific operation of the control circuit 1B for switching the control voltage while referring to FIG. 4.

In FIG. 4, first of all, when the control signal is a "ground signal", no base current is supplied to the transistors 124, 125, so both of the transistors 124, 125 are turned off or in their OFF state, and the divided voltage value Vs of the S terminal voltage VS becomes equal to the battery voltage itself.

Accordingly, the Zener diode 120 is made conductive so the transistor 104 is always turned on or made into its ON state, as a consequence of which the power MOSFET 101 always becomes interrupted or nonconductive, and hence the power generation voltage becomes 0 V.

On the other hand, when the control signal is a "open signal", the Zener diode 128 is interrupted by the divided voltage value of the battery voltage due to the resistors 126, 127, so the transistor 125 is also interrupted, and the transistor 124 becomes conductive.

It is needless to say that at this time, the divided voltage value of the battery voltage due to the resistors 126, 127 is set to a value that is lower than the breakdown voltage of the Zener diode 128, but equal to or higher than a voltage value enough to make the transistor 124 conductive.

As a result, the divided voltage Vs of the S terminal voltage VS is determined by a voltage division ratio between the resistance value of the resistor 121 and the series resistance value of the resistors 122, 123.

Here, when the divided voltage Vs becomes a voltage value larger than the sum of a base voltage that makes the transistor 104 conductive and the breakdown voltage of the Zener diode 120, the transistor 104 is turned on (made conductive).

On the other hand, when the divided voltage Vs is less than the sum of the base voltage that makes the transistor 104 conductive and the breakdown voltage of the Zener diode 120, the transistor 104 is turned off (interrupted).

In this manner, the power generation voltage of the generator 2 is controlled to be constant due to the repeated one-off control of the field current. At this time, the control voltage determined by the divided voltage Vs is called a first control voltage, as stated above.

In addition, when the control signal is a "pull-up signal", the C terminal voltage is raised substantially up to the battery voltage, so the Zener diode 128 becomes conductive, and the transistor 125 also becomes conductive, as a result of which the divided voltage Vs is determined by the voltage division ratio of the resistors 121, 122. At this time, the control voltage determined by the divided voltage Vs is called a second control voltage, as stated above.

As described above, with the control signal from the external control unit 5B being formed into only one system or group, it is possible to control the power generation voltage at three level. Accordingly, the construction of the control circuit 1B and the control unit 503B can be simplified as stated above.

In addition, the control voltage upon switching thereof can be gradually increased or decreased by duty controlling the base voltage of the transistor 501 or 502 by means of the control unit 503B in the external control unit 5B without particularly changing the circuit configuration of the control circuit 1B. As a consequence, it is possible to make the operating condition of the vehicle stable by avoiding a sudden change in the target value of the power generation voltage.

Moreover, by gradually increasing or decreasing the power generation voltage based on the duty control, it is possible to achieve stable engine rotation even when the battery 4 is being charged at fast speed or when the number of revolutions per minute of the engine is low.

Further, by setting the first control voltage to a normal power generation voltage, the control circuit 1B can continue the normal control of the power generation voltage even if the C terminal is disconnected, for instance.

Although the voltage detection circuit (Zener diode 120) in the control circuit 1B uses the divided voltage Vs of the S terminal voltage VS as the detected voltage of the battery voltage, the B terminal voltage can instead be used.

In this case, the voltage detection terminal (S terminal) can be omitted, thus making it possible to achieve further cost reduction.

The invention claimed is:

1. A control system for a vehicular generator comprising:
   a generator that is installed on a vehicle and has an armature coil and a field coil;
   a battery that is installed on said vehicle so as to be charged by a power generation voltage output from said armature coil; and
   a control circuit that has a voltage detection circuit for detecting a terminal voltage of said battery, and adjusts said power generation voltage to a predetermined voltage by controlling to turn a field current supplied to said field coil on and off in accordance with the terminal voltage of said battery;
   wherein a single control terminal is provided on said control circuit;
   an external control unit is connected to said control terminal;
   said external control unit supplies either one of a ground signal, an open signal and a pull-up signal to said control terminal as a control signal in accordance with the terminal voltage of said battery and an operating condition of said vehicle; and
   said control circuit serves to make said generator into a power generation stop state by interrupting said field current in response to said ground signal supplied to said control terminal, adjust said power generation voltage to a first control voltage for normal time by controlling to turn said field current on and off in response to said open signal supplied to said control terminal, and adjust said power generation voltage to a second control voltage higher than said first control voltage by controlling to turn said field current on and off in response to said pull-up signal supplied to said control terminal.

2. The control system for a vehicular generator as set forth in claim 1, wherein
   said voltage detection circuit has resistors to generate a reference voltage that becomes a comparison reference with respect to the terminal voltage of said battery; and
   said control circuit adjusts said power generation voltage in response to said control signal supplied from said external control unit to said control terminal by changing a voltage division ratio between said resistors to change said reference voltage in accordance with said control signal.

3. The control system for a vehicular generator as set forth in claim 1, wherein
   said voltage detection circuit has voltage detection resistors that divide the terminal voltage of said battery so as to convert it into a detected voltage; and
   said control circuit adjusts said power generation voltage in response to said control signal supplied from said external control unit by changing a resistance ratio between said voltage detection resistors in accordance with said control signal.

4. The electric power steering control apparatus for a vehicle as set forth in claim 1, wherein
   said external control unit controls said control signal into a duty signal upon switching of said control signal; and
   said control circuit switches a change in said control voltage of adjusting said power generation voltage in a linear manner by said duty signal upon switching of said control signal.

* * * * *